United States Patent [19]
Gheorghita

[11] Patent Number: 5,863,117
[45] Date of Patent: Jan. 26, 1999

[54] METHOD FOR CONTINUOUSLY MIXING POLYMER MATERIALS AND MACHINE FOR IMPLEMENTING THE METHOD

[75] Inventor: Victor Gheorghita, Castellanza, Italy

[73] Assignee: Pomini S.P.A., Castellanza, Italy

[21] Appl. No.: 840,493

[22] Filed: Apr. 21, 1997

[30] Foreign Application Priority Data

May 17, 1996 [IT] Italy .................................. MI96A0993

[51] Int. Cl.⁶ ........................................................ B01F 7/08
[52] U.S. Cl. ................................ 366/85; 366/83; 366/301
[58] Field of Search ................................. 366/81, 83, 85, 366/297, 301, 318, 322, 319, 323; 425/205, 208, 209, 204

[56] References Cited

U.S. PATENT DOCUMENTS

| | | |
|---|---|---|
| 2,948,928 | 8/1960 | Ebneth et al. . |
| 3,239,878 | 3/1966 | Ahlefeld et al. . |
| 3,598,139 | 8/1971 | Boden et al. . |
| 3,615,254 | 10/1971 | Eichenseer et al. . |
| 3,764,118 | 10/1973 | Matsuoka . |
| 4,299,499 | 11/1981 | Buchheit .................................... 366/85 |
| 4,332,481 | 6/1982 | Inoue et al. .............................. 366/301 |
| 4,400,218 | 8/1983 | Koch et al. ................................ 366/83 |
| 4,423,960 | 1/1984 | Anders ....................................... 366/85 |
| 4,514,090 | 4/1985 | Neubauer et al. . |
| 4,752,135 | 6/1988 | Loomans . |
| 4,826,323 | 5/1989 | Loomans et al. ........................ 366/301 |
| 5,267,788 | 12/1993 | Rockstedt .................................. 366/85 |
| 5,358,693 | 10/1994 | Brinkmann et al. . |
| 5,516,205 | 5/1996 | Oda et al. ................................ 366/301 |

FOREIGN PATENT DOCUMENTS

| | | |
|---|---|---|
| 40 18 094 | 12/1990 | Germany . |
| 1 468 482 | 3/1977 | United Kingdom . |

OTHER PUBLICATIONS

Abstract, JP 55164114, Dec. 20, 1980.
Abstract, JP 58106422, Jun. 22, 1983.

*Primary Examiner*—Tony G. SooHoo
*Attorney, Agent, or Firm*—Herbert Dubno

[57] ABSTRACT

Method for continuously mixing polymer materials by means of a continuous mixing machine having a mixing chamber provided with at least one opening for supplying the polymer and at least one mouth for discharging the mixture and having arranged inside it a pair of rotors parallel with one another, the method includes the stages of:

supplying the material and any additives to the mixing chamber through the supply mouth; and mixing and feeding the materials towards the outlet, by pre-mixing performed by axial sections of rotors rotating tangentially with respect to one another, and subsequent mixing performed by axial sections of the rotors rotating in a mutually intermeshing manner.

14 Claims, 2 Drawing Sheets

5,863,117

METHOD FOR CONTINUOUSLY MIXING POLYMER MATERIALS AND MACHINE FOR IMPLEMENTING THE METHOD

SPECIFICATION

1. Field of the Invention

The present invention relates to a method for continuously mixing polymer materials and an associated machine with parallel rotors, which method comprises at least one pre-mixing stage performed by means of corresponding axial sections of the rotors rotating tangentially with respect to one another and at least one subsequent mixing stage performed by means of corresponding axial sections of the rotors rotating in a mutually interpenetrating manner.

2. Background of the Invention

In the technical field relating to the mixing of polymer materials it is known of the mixing operation by means of production cycles of the discontinuous or continuous type.

The continuous process offers numerous advantages compared to the discontinuous process, both from a technological point of view and with regard to plant design.

Technologically speaking, the continuous process allows the most important processing variables to be monitored at each moment, ensuring more constant quality of the processed product, with a consequent reduction in the number of product rejects.

In addition, with continuous processing it is possible to eliminate entirely the dead time which is typical of discontinuous processing and which occurs in particular during charging of the raw materials and discharging of the mixture, but also during the operations involving cleaning of the charging hopper.

In addition to the aforementioned advantages relating to monitoring, the continuous process also allows the parameters being monitored to be corrected more easily without major consequences, since this correction has an immediate effect and is not linked to the time variable which, on the other hand, is of fundamental importance in discontinuous cycles during which there are logic and time sequences to be respected during the cycle.

From the point of view of plant design, a continuous processing line offers advantages because the installed power levels are lower since the machinery, as regards both the actual mixer and the auxiliary equipment (control units, compressors, metering scales, etc.), has smaller dimensions and is therefore lighter.

The technology for the continuous mixing of rubber, however, is still in the early stages of development the difficulties encountered in achieving good qualitative results in terms of dispersion of the components forming the mixture and a low discharge temperature of the mixture itself, necessary in order to avoid a premature action of the cross-linking agents present in the mixture, result in "scorching" of the mixture, which could no longer be used for the subsequent processing operations, such as extrusion, moulding and the like.

In addition to the above, it is also known of the problems relating to the continuous supplying of materials in batches since, during metering, performed by means of gravimetric metering devices, a large quantity of air is introduced into the mixing chamber, causing an increase in the apparent volume of the mixture, preventing correct feeding thereof towards the mixing zones situated thereafter.

In an attempt to find solutions to the problems, continuous machines equipped with a pair of rotors of the tangential type have been provided, the rotors are particularly suitable for the zone immediately adjacent to the supplying zone, but on the other hand of limited efficiency in the zones of the machine situated thereafter where it is required to incorporate the fillers into the elastomer matrix, while maintaining good control over the temperature of the mixture.

Machines equipped with a pair of rotors of the interpenetrating type have also been provided. The choice of one or other machine depends on the degree of viscosity of the mixture to be processed, the physical state and the dimensions of the raw materials to be supplied.

There also exist machines consisting of a single specially shaped screw rotating inside a cylinder with walls provided with circular pegs or fixed parts of various shapes, which however have the purpose of distributing the flows of material in several directions and providing a cutting action.

These machines are used with a wide range of products of varying viscosity, but are able to mix efficiently the products only if the viscosity of the material is low and if the material has a purely thermoplastic behaviour.

In the case of materials with a high viscosity, these single screws are able to exert only a distributive and homogenizing action on the material, without, however, providing the high shearing forces necessary for a good mixing action.

In other words, it is not known in the technical sector relating to the continuous processing of polymer materials, of the possibility of obtaining, in a single machine, complete mixing which comprises the following stages:

reduction in the average diameter of the particles of the individual components of the mixture and incorporation of the particles thus reduced into the elastomer matrix (dispersive mixing);

uniform distribution and homogenization of the particles inside the mixture (distributive mixing); and maintenance of optimum control over the temperature of the mixture during all the mixing stages.

OBJECTS OF THE INVENTION

A principle object of the present invention is to provide a method for continuously mixing plastic materials overcoming the above-mentioned drawbacks, and still another object is to provide a pair of rotors designed to allow processing of any type of mixture, independently of its greater or lesser viscosity.

SUMMARY OF THE INVENTION

Within the scope of the technical problem, the machine according to the invention should be provided with rotors providing the following:

a high transportation volume in the first zone situated immediately after the supply hopper;

sufficient thrusting of the material towards the end orifice, resulting in the material emerging without pulsed flow effects;

optimum mixing of all the ingredients of the mixture, both solid and liquid, by means of operations on the material which produce an optimum effect in terms of both dispersive mixing and distributive mixing; and efficient control over the temperature of the mixture, in particular in the end zone of the machine close to the discharge point.

These results are obtained by the method according to the present invention, which comprises at least one pre-mixing stage performed by means of axial sections of the rotors rotating and having respective tangential external surfaces with respect to one another and at least one subsequent mixing stage performed by means of sections of the rotors rotating in a mutually intermeshing manner.

The mixing machine carrying out the inventive method is also provided.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
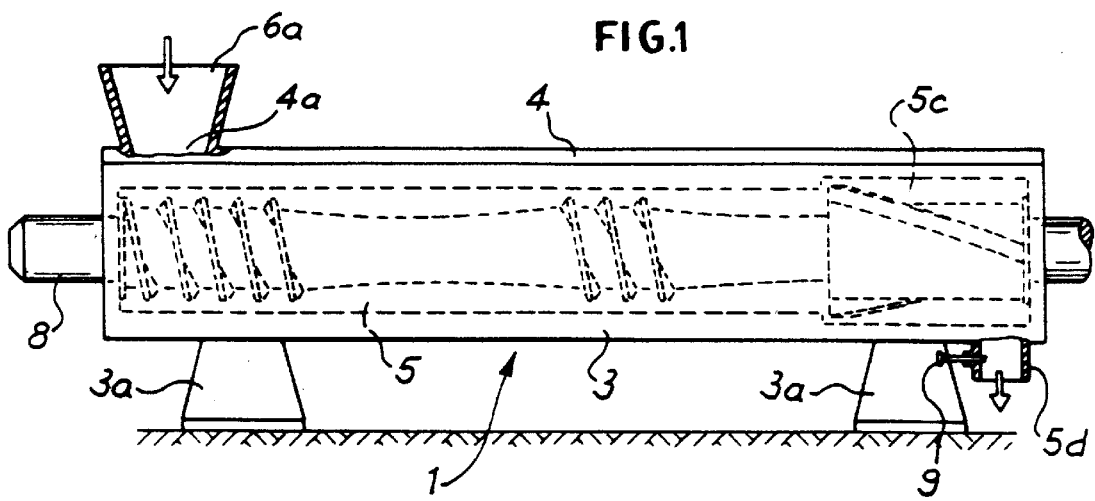
FIG. 1 is a side view of the continuous mixing machine according to the present invention.
Figure 2:
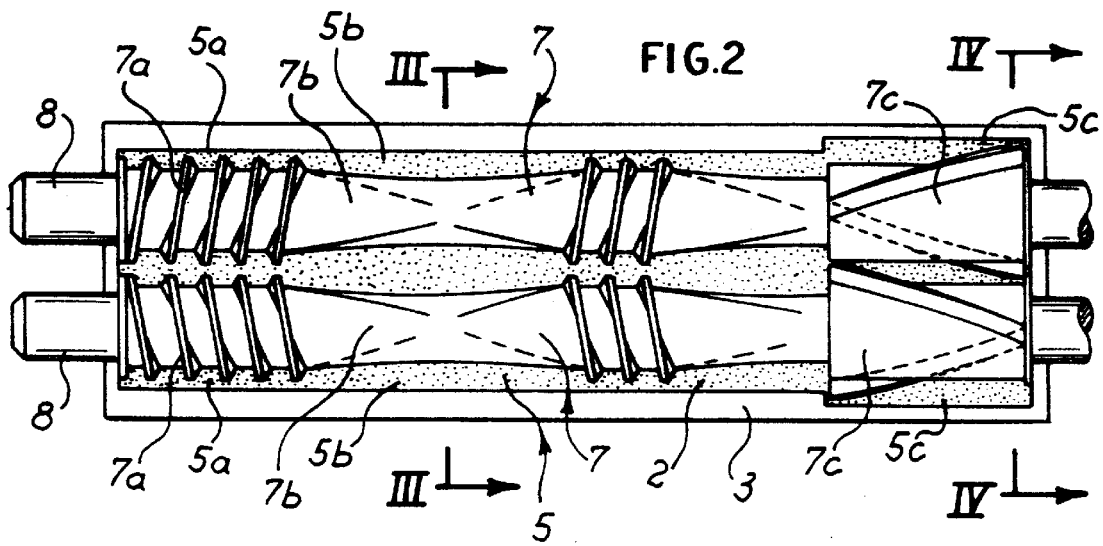
FIG. 2 is a plan view of the machine according to FIG. 1, open at the top.
Figure 3:
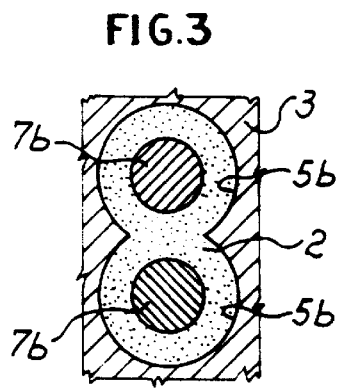
FIG. 3 is a cross-section along the plane indicated by III—III in FIG. 2.
Figure 4:
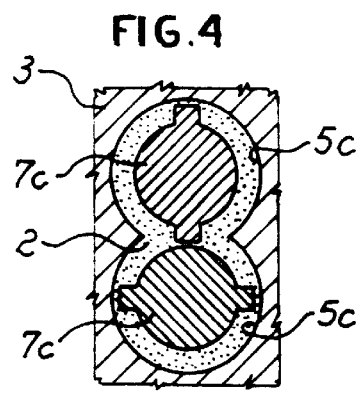
FIG. 4 is a cross-section along the plane indicated by IV—IV in FIG. 2.
Figure 5A:
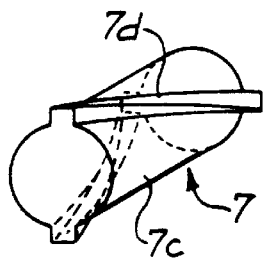
FIGS. 5a, 5b are respectively perspective views and the associated planar development of the interpenetrating part of the two rotors.
Figure 5B:
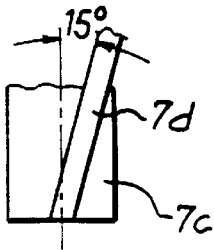
Figure 6A:
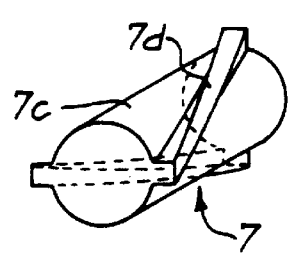
FIGS. 6a, 6b are views, corresponding to those of FIGS. 5a, 5b, of the other rotor of the pair.
Figure 6B:

As shown in the Drawings, a machine 1 for continuously mixing polymer materials 2 comprises a housing 3 which is supported by bases 3a resting on the ground and provided with a cover 4 which can be opened by means of rotation about associated hinges not shown.

The inside of the housing is formed so as to provide a chamber 5 having a cross-section substantially in the form of an overturned figure-of-eight and extending over the entire axial length of the machine.

At the end of the chamber 5 there is located a mouth 5d for discharging the material downwards, the aperture of which may be adjusted by means of associated devices described below.

The upper surface of the cover 4 is provided with at least one opening 4a provided with an associated hopper 6a, for supplying the polymer 2 and the additives necessary for obtaining the particular chemicophysical characteristics required for each specific type of mixture.

The chamber 5 has arranged inside it the pair of mixing rotors 7 operated by coaxial motors 8 which are arranged at one end of the container 3; each of the rotors 7 has external surface sections which extend axially from the supply zone to the mouth 5d for discharging the mixture 2 and are differently formed depending on the different processing operation required in the corresponding chamber section.

More particularly, the first rotor section 7a, corresponding to the chamber zone 5a close to the hopper 6 supplying the polymer 2, is formed in the manner of a screw designed to push the polymer towards the next section 5b of the chamber 5 inside which the rotors 7 have sections 7b with an external surface such that the two envelopes circumscribed by these surfaces do not overlap and remain adjacent with respect to one another and hence designed to ensure a high capacity for feeding of the material as well as a high mixing capacity. In the chamber section 5a, therefore, efficient pre-mixing of the components is obtained under ambient pressure and controlled temperature conditions, such that the temperature is kept below 80° C. in order to avoid scorching of the mixture.

In the last section 7c of their axial extension, on the other hand, the rotors 7 have an external surface such that the two rotors are mutually intermeshing and therefore favor dispersive mixing and homogenization of the mixture.

In correspondence with the greater size of the rotors 7 in the end processing zone, the chamber 5 also has a section 5c with an axial length substantially corresponding to that of the section 7c of the intermeshing rotors, but an increased cross-section.

This increase in the size of the chamber 5 in the end section 5c involves a corresponding increase in the area of contact of the mixture with the metal surface of the chamber 5 inside the cavity of which the cooling liquid flows, thus favouring control and lowering of the temperature of the mixture before it emerges from the chamber 5 through the discharge mouth 5d.

The mouth 5d for discharging the mixture from the machine is provided with devices for adjusting its aperture, substantially consisting of a gate valve 9 which can be actuated so as to perform a translatory movement by means of associated operating means known per se and therefore not illustrated in detail.

By means of the adjustment of the mixture discharge aperture it is also possible to obtain different filling of the mixing chamber and hence different energy transferred to the mixture itself.

As illustrated in FIGS. 5a, 5b and 6a, 6b, the rotor section 5c with an intermeshing configuration has, in a preferred embodiment, the flange 7d radially projecting from the rotor core and arranged in the manner of a helix with inclination of its axis by about 15° with respect to the longitudinal axis of the rotor. This angle of inclination, however, may be comprised between 10° and 25° depending on the different characteristics of the polymer to be mixed.

In the drawings illustrated and described, the rotors 5 are counter-rotating and have a symmetrical configuration with respect to the longitudinal axis of the machine; during assembly, however, one of the two rotors is offset with respect to the other one by a suitable angle, so as to prevent the intermeshing sections from coming into contact and damaging the machine.

In addition, the right-hand or left-hand configuration of the helix is obviously linked to the direction of rotation of the associated rotor so as to ensure correct feeding of the material from the supply mouth to the discharge mouth.

Figure 7:
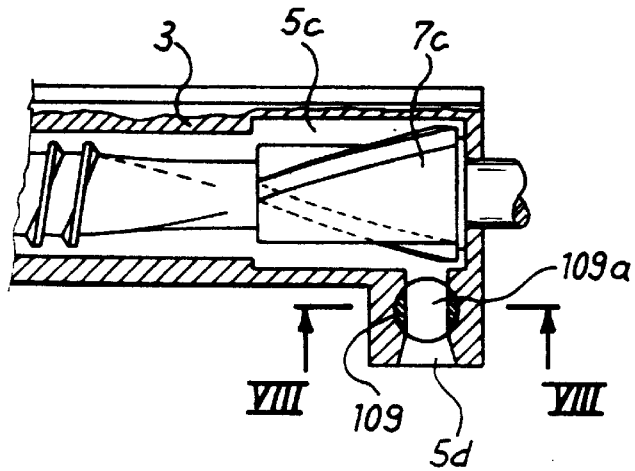
FIG. 7 is a schematic partial section through the end zone of the machine with a further embodiment of the device for adjusting discharging of the material.
Figure 8:
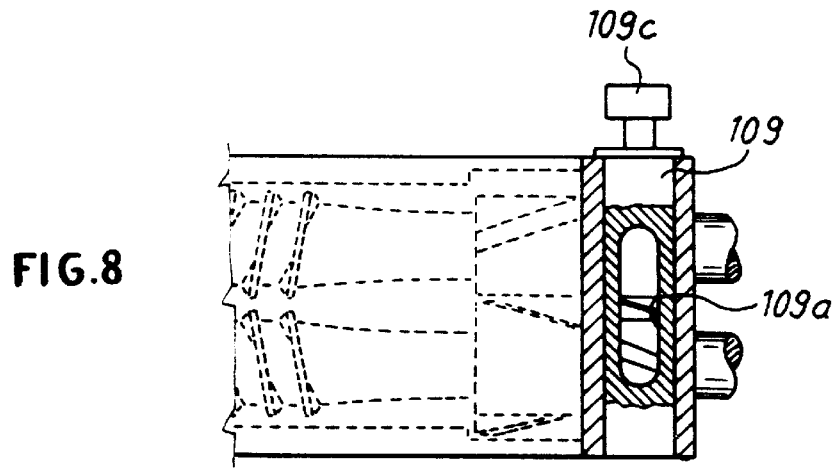
FIG. 8 is a partial section along the plane indicated by VIII—VIII in FIG. 7.

As illustrated in FIGS. 7 and 8, a variation of embodiment of the means for adjusting the discharge opening 5d is also provided.

In this embodiment the means consist of a cylindrical element 109, internally hollow at least over a suitable longitudinal section, where a opening 109a is formed on the side surface of the cylinder.

This cylinder is arranged transversely with respect to the mixture discharge mouth 5d and has mounted, at one of its ends, rotationally operating devices 109c which are known per se and hence only schematically shown in the Figures.

By operating this cylinder and causing it to rotate it is possible to bring the opening 109a of the cylinder 109 into total/partial alignment with the discharge mouth 5d of the chamber 5, totally/partially opening the latter and allowing the material to flow out in a controlled manner.

As shown in FIG. 7, the discharge cross-section of the opening 5d is frustoconical with the widest part directed downwards so as to favor flowing out of the material.

Many variants may be introduced as regards the realization of the parts which make up the invention, without thereby departing from the scope of protection of the present patent as defined by the claims which follow.

I claim:

1. A method for continuously mixing polymer materials by a continuous mixing extruder comprising the steps of:
   (a) supplying the polymer materials having a high viscosity through a supply mouth to a mixing chamber of the extruder;
   (b) simultaneously with step (a) supplying additives to be mixed with the polymer materials in said mixing chamber through the supply mouth;
   (c) processing said polymer materials and additives by a pair of rotors formed with respective first and second threaded sections rotatable about parallel axes in said mixing chamber by:
      ($c_1$) at least once preblending said additives and polymer materials at atmospheric pressure by first threaded axial sections of said rotors circumscribing respective envelopes which do not overlap each other, and
      ($c_2$) thereafter mixing said premixed polymer materials and additives to form a homogenized mixture thereof by second threaded axial sections of said rotors intermeshing with each other; and
   (d) thereafter discharging the mixture through a discharge mouth formed axially downstream from the supply mouth.

2. The method defined in claim 1 wherein said preblending step ($c_1$) is performed at a temperature less than 80° C.

3. The method defined in claim 2 wherein said preblending step ($c_1$) is performed at a temperature less than 50°.

4. A method for continuously mixing rubber materials by a continuous mixing extruder comprising the steps of:
   (a) supplying the rubber materials having a high viscosity through a supply mouth to a mixing chamber of the extruder;
   (b) simultaneously with step (a) supplying additives to be mixed with the rubber materials in said mixing chamber through the supply mouth;
   (c) processing said rubber materials and additives by a pair of rotors formed with respective first and second threaded sections rotatable about parallel axes in said mixing chamber by:
      ($c_1$) at least once preblending said additives and rubber materials at a temperature less than 80° C. by first threaded axial sections of said rotors circumscribing respective envelopes which do not overlap each other, thus maintaining the high viscosity of the rubber materials; and
      ($c_2$) thereafter mixing said preblended rubber materials and additives to form a homogenized mixture thereof by second threaded axial sections of said rotors intermeshing with each other; and
   (d) thereafter discharging the mixture through a discharge mouth formed axially downstream from the supply mouth.

5. A machine for continuously mixing polymer materials and additives comprising:
   a housing having an exterior defining an elongated mixing chamber which extends along a longitudinal axis;
   feeding means for supplying the polymer materials and additives in said chamber;
   a pair of rotors rotatable about rotor axes parallel to the longitudinal axis in said chamber and formed with respective at least one first and second threaded axial sections,
      said one first threaded sections cooperating with the feeding means to preblend the polymer materials and additives axially displaceable along a path and circumscribing respective envelopes which do not overlap each other,
      said one second threaded sections located downstream from the respective one first threaded sections and intermeshing with each other to form a homogenized mixture of the polymer materials and additives; and
   discharging means spaced axially downstream from the feeding means and cooperating with the second threaded sections of the rotors for evacuating the mixture from the mixing chamber, said discharging means being formed with a mouth provided with a substantially frustoconical section which extends along a section axis stretching out transversely to the longitudinal axis and axially widens toward a bottom of the mouth.

6. The machine defined in claim 5 wherein a part of the exterior of the housing receiving the one second threaded sections of the rotors has a greater cross-section than a cross-section of another part of the exterior receiving the one threaded sections of the rotors.

7. The machine defined in claim 6 wherein the part of the exterior receiving the one second sections of the rotors is substantially as long as said one second threaded sections.

8. The machine defined in claim 5 wherein the one second sections of the rotors are formed with respective helical ribs each wound at an angle from 10° to 25° with respect to the respective rotor axis.

9. The machine defined in claim 8 wherein said angle is from 12° to 18°.

10. The machine defined in claim 5 wherein the one first sections of rotors are screws.

11. The machined defined in claim 5 wherein the discharging means is provided with adjusting means for controlling evacuation of the mixture through the discharge mouth.

12. The machined defined in claim 11 wherein the adjusting means includes a gate valve actuatable to perform a translatory movement.

13. The machined defined in claim 11 wherein the adjusting means includes:
   a cylinder extending along a cylinder axis which lies transversely to the section axis and being at least partially hollow and formed with a peripheral wall which is formed with an aperture, and
   actuating means for rotating said cylinder to bring said aperture in alignment with the discharge mouth to discharge the mixture.

14. A machine for continuously mixing rubber materials and additives comprising:
   a housing having an exterior defining an elongated mixing chamber which extends along a longitudinal axis;
   feeding means for supplying the rubber material and additives in said chamber;
   a pair of rotors counterrotatable about rotor axes parallel to the longitudinal axis in said chamber and formed with respective at least one first and second threaded axial sections, said one first threaded sections cooperating with the feeding means to preblend the rubber material and additives axially displaceable along a path at a temperature less than 80° C. and circumscribing respective envelopes which do not overlap each other, said one second threaded sections located downstream from the respective one first threaded sections and intermeshing with each other to form a homogenized mixture of the rubber materials and additives; and discharging means spaced axially downstream from the feeding means and cooperating with the second threaded sections of the rotors for evacuating the mixture from the mixing chamber.

* * * * *

UNITED STATES PATENT AND TRADEMARK OFFICE
CERTIFICATE OF CORRRECTION

PATENT NO. : 5,863,117
DATED : January 26, 1999
INVENTOR(S) : Victor Gheorghita It is certified that error appears in the above-identified patent and that said Letters Patent is hereby corrected as shown below:

On the title page, insert item 56

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | 0 | 5 | 1 | 3 | 7 | 4 | 2 | 05/1992 | EPO | | | |
| | | 1 | 0 | 2 | 3 | 0 | 1 | 1 | 01/1958 | Germany | | | |
| | | 1 | 4 | 6 | 8 | 4 | 8 | 1 | 03/1977 | Great Britain | | | |
| | | 0 | 2 | 8 | 6 | 0 | 1 | 5 | 10/1988 | EPO | | | |

Signed and Sealed this

Nineteenth Day of October, 1999

*Attest:*

Q. TODD DICKINSON

*Attesting Officer*   *Acting Commissioner of Patents and Trademarks*